No. 819,436. PATENTED MAY 1, 1906.
G. H. JONES.
MAGNETIC METAL COLLECTOR FOR GEAR CASINGS.
APPLICATION FILED JULY 14, 1905.

WITNESSES:
Chas F. Clagett
Chas L. Wolf

INVENTOR
George Hill Jones.
BY his ATTORNEY
Charles A. Stephens

UNITED STATES PATENT OFFICE.

GEORGE HILL JONES, OF PHILADELPHIA, PENNSYLVANIA.

MAGNETIC METAL-COLLECTOR FOR GEAR-CASINGS.

No. 819,436.  Specification of Letters Patent.  Patented May 1, 1906.

Application filed July 14, 1905. Serial No. 269,610.

*To all whom it may concern:*

Be it known that I, GEORGE HILL JONES, a citizen of the United States, and a resident of Philadelphia, in the county of Philadelphia and State of Pennsylvania, have invented certain new and useful Improvements in Magnetic Metal-Collectors for Gear-Casings, of which the following is a specification.

My invention relates to a magnetic metal-collector for gear-casings.

It is well known that heretofore in the constant operation of gears, particularly when employed to drive a heavy load or for great speed, they become worn and in some cases chipped in clashing and that these particles of metal drop into the lubricating-oil in the casing and are carried up therewith between the gears and into the bearings, resulting in a short time in so cutting out the teeth of the gears and the bearings that the gears will mesh loosely, and consequently their motion will be jerky and that the bearings will become worn, thus shortening the life of usefulness of said parts and requiring new parts to be frequently substituted therefor.

It is therefore the object of this invention to obviate this objectionable feature by providing magnetic means within the casing for collecting the metal particles from the oil as they fall therein and retaining them, so that they cannot be carried up between the gears or into the bearings, thereby greatly lengthening the life of said parts.

A further object of this invention is to provide means of the character set forth embodying advantages in point of effectiveness, easy attachment, simplicity, and expensiveness of construction.

Figure 1:
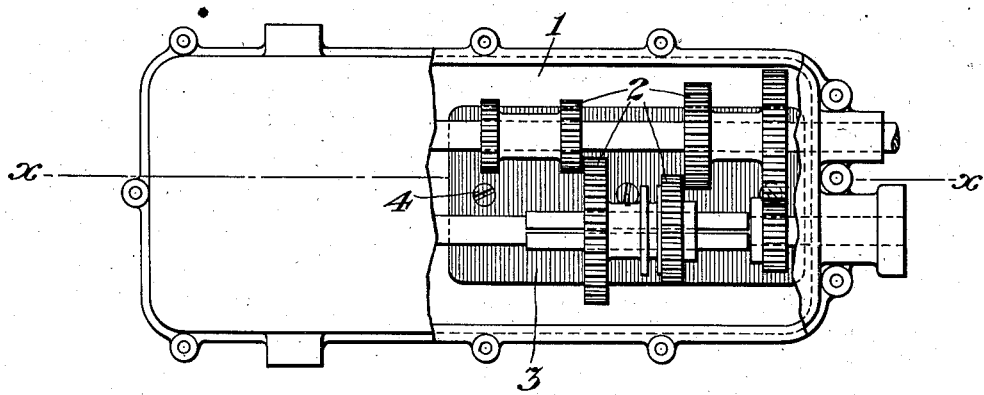
Figure 2:
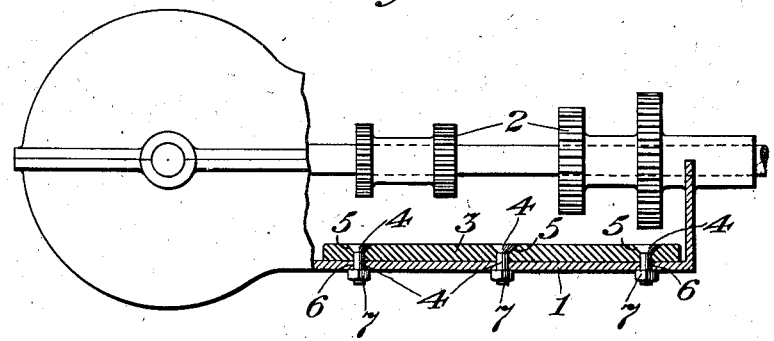

In the drawings, Figure 1 is a plan view of a gear-casing, partly broken away and showing my magnetic collector therein; and Fig. 2 is a side view of the same, partly broken away.

In both figures of the drawings illustrating my invention like reference characters designate corresponding parts.

Referring to the drawings, 1 designates a gear-casing which is adapted to contain liquid lubricant, and 2 a system of sliding gears supported therein. To the interior surface of the casing, preferably at the bottom to take advantage of the specific gravity of the metal particles, I secure a magnetic bar 3 by any suitable means, preferably by bolts 4, extending through holes 5 in said bar and holes 6 in the casing and having nuts 7 on their ends.

It will be understood from the foregoing description, considered in connection with the accompanying drawings, that when the particles of metal worn or broken from the gears fall into the lubricating liquid they are attracted by the magnetic bar and adhere thereto, thus being prevented from being carried up between the gears or into the bearings, and that when the bar becomes covered with these metal particles they can easily and readily be removed by scraping or in any other manner desired.

Having now described my invention, what I claim as new, and desire to secure by Letters Patent, is—

1. The combination with a gear-casing, of a magnetic bar therein, substantially as described.

2. The combination with a gear-casing, of a magnetic bar secured therein, substantially as described.

3. The combination with a gear-casing, of a magnetic bar therein and means for removably securing said bar in place, substantially as described.

4. The combination with a gear-casing, of means therein for attracting metal particles, substantially as described.

5. The combination with a gear-casing, of a magnetic bar therein, bolts passing through said bar and casing and nuts on said bolts, substantially as described.

Signed at New York, in the county of New York and State of New York, this 26th day of June, A. D. 1905.

GEORGE HILL JONES.

Witnesses:
 CHAS. L. WOLF,
 ALBERT B. BLACKWOOD.